E. ANTHONY.
Rotary Fluid Meter or Motor.

No. 199,397. Patented Jan. 22, 1878.

Attest:
H. D. Perine
A. Scott

E. Anthony,
Inventor.
By C. M. Parks
Atty.

UNITED STATES PATENT OFFICE.

EDMUND ANTHONY, OF ALBANY, NEW YORK, ASSIGNOR OF ONE-HALF HIS RIGHT TO HENRY Q. HAWLEY, OF SAME PLACE.

IMPROVEMENT IN ROTARY FLUID METERS AND MOTORS.

Specification forming part of Letters Patent No. 199,397, dated January 22, 1878; application filed September 12, 1877.

*To all whom it may concern:*

Be it known that I, EDMUND ANTHONY, of Albany, county of Albany, and State of New York, have invented an Improvement in Fluid Meters and Motors; and I do hereby declare the following to be a full and correct description of the same, reference being had to the accompanying drawings, in which—

Figure 1:
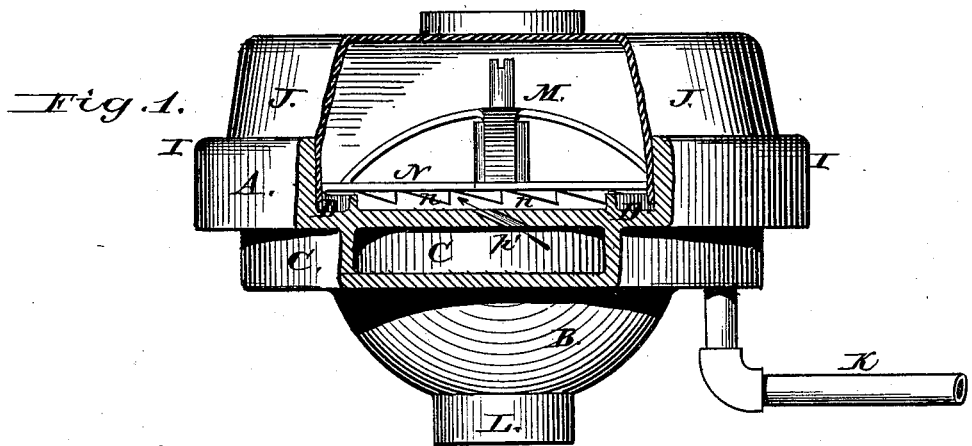
Figure 2:
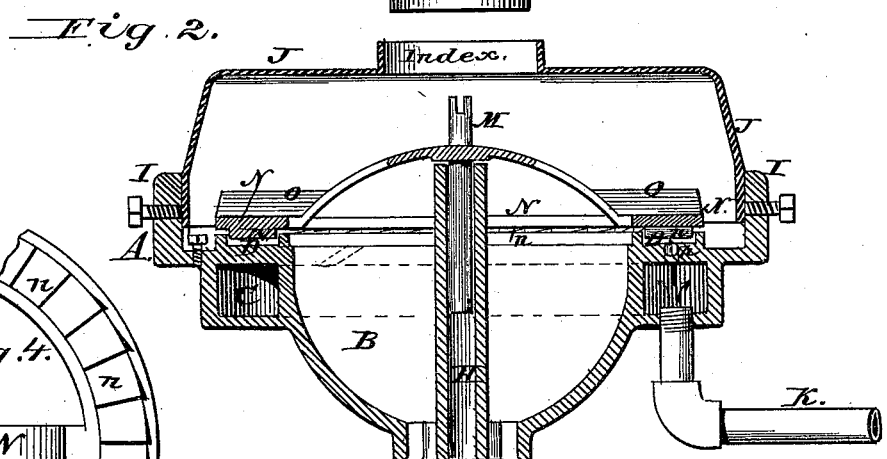
Figure 4:
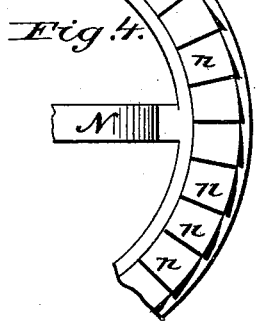
Figure 3:
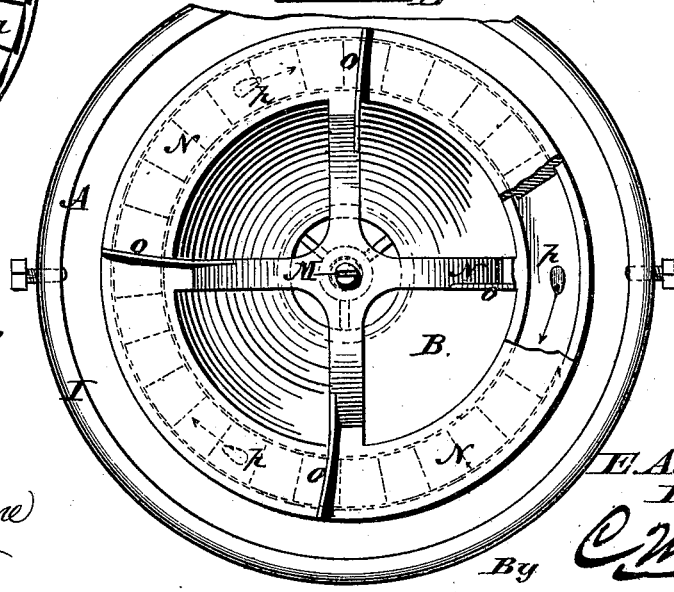

Figure 1 is a side view with part broken away, showing the interior. Fig. 2 is a vertical section. Fig. 3 is a top view, partly in section, with the top removed; and Fig. 4 is part of the revolving wheel, showing the teeth.

My invention relates to a device for measuring fluids by indicating the amount of fluid passing through it upon a dial or index; and it may also be used as a fluid-motor.

My invention consists in admitting the fluid underneath a toothed wheel which revolves in a groove. In said groove are diagonal orifices, which emit jets of the fluid against the toothed wheel, and cause it to rise and revolve in the groove in proportion to the amount of fluid admitted, which will hereinafter more fully appear.

In the drawings, A is a cast-metal base, having a spherical part, B, and the annular passage C around it, and an annular groove, D, over the passage C. Within the spherical space B is a hollow standard, H, and surrounding the whole is the flange I, into which the cover J snugly fits, and is secured by screws or otherwise. When the cover J is secured to the base A the whole is a close vessel, except that it has an inlet, K, entering the annular passage C, and the outlet L around the standard H. Within the hollow standard H revolves the shaft M, which carries the wheel N, having teeth or ratchets $n$ underneath. The annular groove D is formed of two parallel flanges, which may be planed down true, and the teeth $n$ upon the wheel N are projecting to loosely fit the groove D, and the space on either side of the teeth closely fit upon the parallel flanges on either side of the groove D. Through the upper side of the annular passage C are diagonal or oblique orifices $p$, admitting the fluid under the wheel N against the teeth $n$ as they lie in the groove D.

The operation of my device is as follows: The cap J having been properly secured to the base A, water or other fluid is let into the annular passage C by means of the inlet K. When said passage is filled the water will flow out of the oblique orifices $p$ against the teeth $n$ of the wheel N and into the groove D. When it is filled the wheel N will be raised sufficiently to let the water escape. When it is thus relieved of the friction, and the water continues to flow against the teeth $n$, the wheel N will revolve. The shaft M, revolving in the hollow standard H, will allow the wheel to rise. The water escaping from between the teeth $n$ will fill the entire vessel, and escape through the escape-pipe L. To avoid a too rapid momentum of the wheel N, wings $o$ are placed on the top of the wheel N to retard its progress.

If my device is used as a meter, the necessary gearing is attached to the upper end of the shaft M, and a glass in the top will exhibit the index; but if for a motor, the shaft is extended through a stuffing-box in the top and applied to the desired machinery.

Having thus fully described my invention, what I claim, and desire to secure by Letters Patent, is—

1. A fluid meter or motor consisting of a case, A, an annular inlet-passage, C, a groove, D, having small oblique openings $p$ through its bottom and the upper surface of its sides planed, a horizontal wheel, N, consisting of a rim with arms to connect it with a shaft, and having one side of said rim provided with ratchet-teeth in its center and planed edges on each side of said teeth, a shaft, M, and a hollow standard, the whole constructed and arranged as described, so that the said wheel, when at rest in said groove, must make a close joint with it from its planed edges resting upon the planed surfaces of said groove, and so that no fluid can pass through the said groove without floating the wheel and flowing against its teeth in the direction of their revolution, substantially as described.

2. In a fluid meter or motor, a groove having the upper surface of its sides planed, and one or more oblique openings through its bottom, in combination with a flat wheel revolving in said groove, and having ratchet-teeth on one side near its periphery, and planed surfaces on one or both sides of said teeth, the said wheel and groove arranged in the manner described, so that the fluid entering the groove must float the wheel revolving in it and flow against its teeth before it can escape, substantially as described.

3. In a fluid meter or motor, a flat wheel having on one side, near its periphery, ratchet-teeth, in combination with an inlet-pipe having on the side next said wheel a groove to receive said teeth, and having one or more oblique openings, through which the fluid must pass to actuate the wheel, substantially as described.

EDMUND ANTHONY.

Witnesses:
  GIDEON HAWLEY,
  B. J. HACKETT.